United States Patent [19]

Takada

[11] 4,314,680
[45] Feb. 9, 1982

[54] INERTIA RESPONSIVE ACTUATING DEVICE FOR SAFETY BELT RETRACTORS

[76] Inventor: Juichiro Takada, 3-12-1, Shinmachi; Setagayaku, Tokyo, Japan

[21] Appl. No.: 161,224

[22] Filed: Jun. 20, 1980

[51] Int. Cl.³ .................... A62B 35/02; B65H 75/48
[52] U.S. Cl. ............................................... 242/107.4 A
[58] Field of Search ............... 242/107.4 A; 297/478, 297/480; 280/806

[56] References Cited

U.S. PATENT DOCUMENTS

| | | | |
|---|---|---|---|
| 4,083,512 | 4/1978 | Rumpf | 242/107.4 A |
| 4,135,410 | 1/1979 | Filderman | 242/107.4 A X |
| 4,141,518 | 2/1979 | Yamanashi | 242/107.4 A |
| 4,176,809 | 12/1979 | Thomas | 242/107.4 A |

*Primary Examiner*—John M. Jillions
*Attorney, Agent, or Firm*—Brumbaugh, Graves, Donohue & Raymond

[57] ABSTRACT

An inertia responsive actuating device for safety belt retractors comprises a support having a substantially circular hole and an upwardly facing conical surface surrounding the hole and sloping upwardly in all directions from the hole. An inertia mass supported on the support has a locating projection that is received in the hole and a spherical surface surrounding the projection and adapted to roll up the surface of the support in response to an inertial force on the mass. A portion of an actuator engages an upwardly facing surface on the mass and is displaceable generally upwardly in response to rolling motion of the mass. A cam surface on the upper portion of the mass cooperates with a cam follower element on the actuator such that the vertical displacement of such portion of the actuator is substantially greater than the vertical displacement of the mass itself when the mass rolls up the conical surface of the support.

9 Claims, 9 Drawing Figures

INERTIA RESPONSIVE ACTUATING DEVICE FOR SAFETY BELT RETRACTORS

FIELD OF THE INVENTION

The present invention relates to emergency locking belt retractors of the type in which a belt take-up reel is automatically locked against unwinding of the belt from the reel in response to acceleration of the vehicle in any direction and, in particular, an inertia responsive actuating device for such retractors.

BACKGROUND OF THE INVENTION

Emergency locking safety belt retractors are in widespread use throughout the world in vehicle occupant restraint belt systems. Many such retractors have a mechanism for automatically locking the reel against rotation in the unwinding direction in response to acceleration of the vehicle that includes an inertia responsive actuating device which detects acceleration of the vehicle and actuates a locking mechanism associated with the belt take-up reel.

There are basically three types of inertia responsive actuating devices. The first is the pendulum type in which a mass is suspended from a support, commonly a cap that lies above the support and carries a dependent post to which the mass is affixed. Compared to the other two common types of inertia responsive actuating devices, the pendulum type has the disadvantage of requiring an extra assembly operation, that of affixing the mass to the post after the post has been inserted through the hole in the support. The additional cost of that step, although small on a case-by-case basis, adds up to a considerable overall cost over the production of many tens of thousands of devices.

The second general category of devices is the ball type. In its simplest form, the ball type device includes a pawl or other actuator having a horizontal follower surface which rests on top of the ball and is pushed up by wedging action of the ball as the ball rolls up an inclined surface on a support. The wedging action of the ball when it accelerates due to inertial force relative to the support is opposed by the mass of the pawl acting down at a contact point on the pawl and friction at the contact points between the ball, on the one hand, and the support and the pawl, on the other hand. Ordinarily, the frictional force acting at the contact point between the ball and the support is substantially larger than frictional force at the contact point between the ball and the pawl. Therefore, the ball rolls up the inclined surface of the support unless the direction of the inertial force includes an upward component sufficient to reduce or eliminate the frictional force. The effect of friction at the contact point between the ball and the pawl can be shown to be a function of the angle (at any given position) between a line connecting the two contact points and a line perpendicular to the surface of the ball at the contact point between the ball and the pawl, an angle that can be termed the "pressure angle."

In the simple case under consideration, the pressure angle, and therefore the friction, is initially relatively small and increases as the ball rolls up the inclined surface in any direction. As the ball moves from the rest position, the acceleration of the pawl varies appreciably, depending upon the direction of ball motion relative to the pawl pivot for any given acceleration of the ball. Similarly, the amount of displacement of the tip of the pawl in a given time varies substantially with the direction of ball movement. Accordingly, the responsiveness of the simple form of ball type device is highly variable and constitutes an important disadvantage.

Some of the disadvantages of the ball type inertia responsive actuating device can be overcome by providing a cam surface on the ball, such as a downwardly facing conical surface on the ball or an annular follower flange. Such arrangements can be designed to reduce somewhat the variations in response, that is, the directional variation. On the other hand, the initial acceleration of the pawl for a given acceleration of the ball is relatively great, inasmuch as the contact point between the ball and the pawl is located at a point on the surface of the ball where the tangent plane is substantially inclined to the horizontal. As the ball rolls from rest to maximum operating positions, the acceleration of the pawl decreases as a function of displacement. In addition, the pressure angle, and therefore the effect of friction, is at a maximum in the rest, non-actuating position and diminishes at a diminishing rate as a function of displacement. Inasmuch as acceleration of the pawl and the effect of friction are greatest in the rest position, the force required to start the ball rolling is high relative to the force required to keep it rolling. Coupled with the fact that static friction is substantially greater than kinetic friction, this type of actuating device is subject to considerable variation in the time when motion begins following an acceleration of the ball due to inertia in response to acceleration of the support. When the actuator output element is a pawl, the device is still highly directional insofar as the amount of displacement of the pawl for a given displacement of the pawl. Such variation can be eliminated by providing a vertically displaceable slider instead of a pawl, but ordinarily such a slider works against a pawl and such an arrangement requires more parts and other problems and disadvantages.

The third type of inertia responsive actuating device, the standing weight type, comprises a mass of any suitable shape having a stem extending down from the bottom that rests in a socket in a support that keeps the mass from moving appreciably in any horizontal direction but allows the mass to tip over from a standing, upright position. A camming surface, for example, an upwardly facing conical surface on top of the mass, works against a follower projection on a pawl or slider. Such a standing weight device has the advantage of being substantially uniformly responsive to acceleration in any direction, inasmuch as the follower projection on the pawl remains generally centered vertically over the axis of the socket in the base of the support. Such devices can also be designed to provide predictable rates of response and favorable friction characteristics (low starting friction, in particular). They are of relatively simple, inexpensive construction. They have, on the other hand, an important disadvantage, namely, a high hysteresis. The hysteresis problem is perhaps best understood by imagining that the device is slowly tilted from horizontal just to the point when the weight tips over. For example, let it be assumed that the vertical axis tilts 15° before the mass tips over. Having reached that position, the mass then tips through the design angle of tilting within the casing, say 5°. Before the weight will return to the upright position on the base, the casing must be tilted back down by the same 5°, and the 5° can be termed the hysteresis. As a practical matter, the relatively high hysteresis results in the retractor being subject to remaining in locked condition when the vehicle stops on a downward incline. In the example, the retractor is prone to staying locked when the vehicle stops on a downward incline of more than about 10°.

SUMMARY OF THE INVENTION

There is provided, in accordance with the present invention, an inertia responsive actuating device that is of very simple construction, thus minimizing manufacturing and assembly costs, responds rapidly and consistently, has favorable relationships between pressure angle and displacement and acceleration of the pawl and displacement and has substantially constant characteristics in all directions of acceleration of the vehicle. In particular, the device comprises a support having a substantially circular hole and a surface of revolution, preferably a conical surface, surrounding the hole and sloping upwardly and outwardly in all directions from the hole. An inertia mass supported on the support has a locating projection that is received in the hole and a spherical surface surrounding the projection and adapted to roll in any direction up the surface around the hole in the support in response to an inertial force on the mass due to a predetermined acceleration of the support relative to the mass. A cam follower portion of an actuator contacts an upwardly facing cam surface on the mass and is displaceable generally upwardly in response to rolling motion of the mass from the seated, at rest position. The cam surface on the inertia mass is shaped such that vertical displacement of the cam follower portion of the actuator is substantially greater than the vertical displacement of the center of gravity of the mass as it rolls up the surface of the support.

The invention has the following preferred characteristics. As mentioned above, the sloping surface adjacent the hole is conical. The hole in the support is slightly larger in diameter than the projection on the mass so that there is no interference between the projection and the hole that might impede displacement of the mass from the seated position and restoration of the mass to the seated position. The actuator is a pawl that is mounted to pivot about an axis located generally above and laterally of the mass, and the cam follower portion of the pawl works against the center of the cam surface on the top of the mass. The spherical surface surrounding the projection on the mass has an extent that is at least coextensive with the distance along the conical surface of the support through which the mass rolls from rest position to full operating position and has a center of curvature coincident with the center of gravity of the mass. The surface of the inertia mass is a surface of revolution about a vertical center line that includes the axis of the bottom projection and its center of gravity so that its response to inertial force is uniform in all directions.

The cam surface of the mass may be a flat horizontal surface or an upwardly concave or conical surface, i.e., a surface of revolution formed by rotating a straight or curved line lying oblique to the vertical center line of the mass about the vertical center line. The cam surface on the mass can also be a centrally located, upwardly extending projection on the mass. In the case of conical or concave cam surfaces, the follower on the pawl is a downwardly extending projection lying vertically above the hole in the base, and in the case of a projecting cam surface on the mass, the cam follower is a disc-like portion of the pawl having a downwardly facing conical or concave surface (i.e., a surface generated by rotating a straight or curved line about the vertical center line of the hole in the support).

For a better understanding of the invention, reference may be made to the following description of exemplary embodiments taken in conjunction with the accompanying drawings.

DESCRIPTION OF THE EMBODIMENTS

Figure 1:
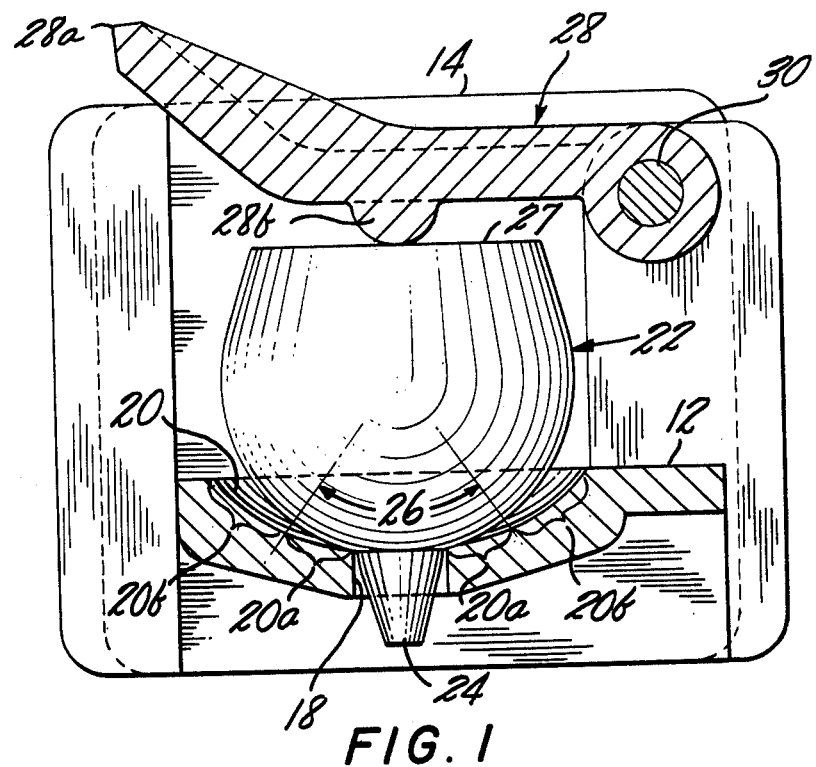
FIG. 1 is a side cross-sectional view of one embodiment of the invention.
Figure 2:
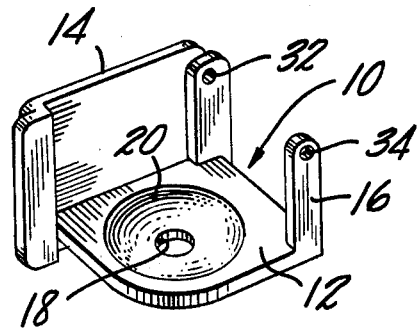
FIG. 2 is a pictorial view of the support of the embodiment shown in FIG. 1.
Figure 3:
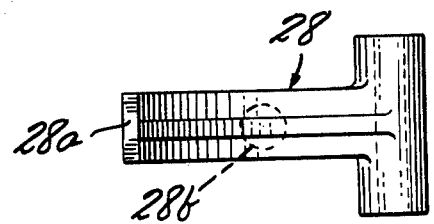
FIG. 3 is a top view of the pawl of the embodiment shown in FIG. 1.

The embodiment shown in FIGS. 1 to 4 comprises a support 10 having a generally horizontally disposed base 12, a side wall 14 suitable for affixation of the support to the frame of a retractor and a mounting post 16 for one end of the pivot pin of a pawl. The base 12 of the support has a circular hole 18 located generally in the center that is surrounded by a conical surface 20a that slopes upwardly away from the hole. Outwardly of the conical surface 20a is a concave surface that may be of any desired shape, but preferably generally matches the shape of the lower part of the inertia mass in the full operating position (see FIG. 4C) and assists in stopping the mass when it has rolled to the full operating position.

The inertia mass 22 has a downwardly and inwardly tapering, generally conical projection 24 that is surrounded by a spherical surface 26 having its center of curvature coincident with the center of gravity of the mass and having an extent at least equal to the extent of the rolling motion of the mass along the conical surface 20a of the base 12. The top cam surface 27 of the mass is flat and lies perpendicular to the vertical axis of the mass (i.e., perpendicular to a line defined by the center of gravity of the mass and the axis of the projection 24). The remaining surface of the mass (between the top cam surface 27 and the lower spherical surface 26) is a surface of revolution about the vertical center line, but the exact shape is of little importance as long as the center of gravity generally coincides with the spherical surface center and the moment of inertia is the same in all directions for uniform response in all directions.

A pawl 28 is attached to the casing by a pivot pin 30 that is received in holes 32 and 34 in the wall 14 and the post 16 of the support. The pawl extends over the top of the mass and has an actuating tip portion 28a that projects up and is located suitably for engagement with a ratchet wheel (not shown) associated with the mechanism which locks the belt reel of the retractor from rotation in the unwinding direction. A dome-like cam follower projection 28b depends from the pawl 28 in a position centered vertically over the hole 18 in the support and bears against the flat cam surface 27 on the top of the inertia mass 22.

In the rest position (FIG. 4A), the mass rests upright in the conical surface 20a of the base 12. The diameter of the hole 18 is slightly larger than the largest diameter of the conical projection 24 on the mass 22, thus leaving a small annular clearance C (say 0.3 to 0.4 mm) surrounding the projection 24 between the projection and the edge of the hole.

In the event of a collision, upset, or sudden stop of the vehicle that produces acceleration of the base 12 in any direction in a suitable predetermined range (say 0.3 g to 0.7 g), the inertia of the mass 22 produces a force F (see FIG. 4A) of sufficient magnitude to produce movement of the mass 22 in a direction opposed to the direction of acceleration of the base. Initially, such motion is opposed only by a frictional force R1 at the contact point between the cam follower projection 28b on the pawl 28 and the mass 22 and a frictional force R2 acting where the mass contacts the base 12 (most likely entirely along the upper edge of the hole 18).

Figure 4A:
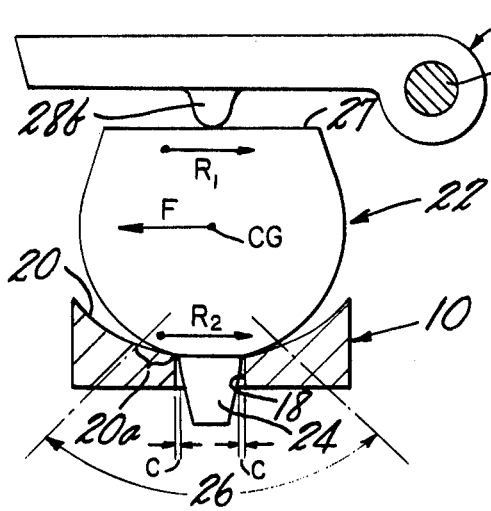
FIGS. 4A to 4D are diagrammatic side views of the embodiment showing it at different stages in the course of moving from the rest position to the full operating position.
Figure 4B:
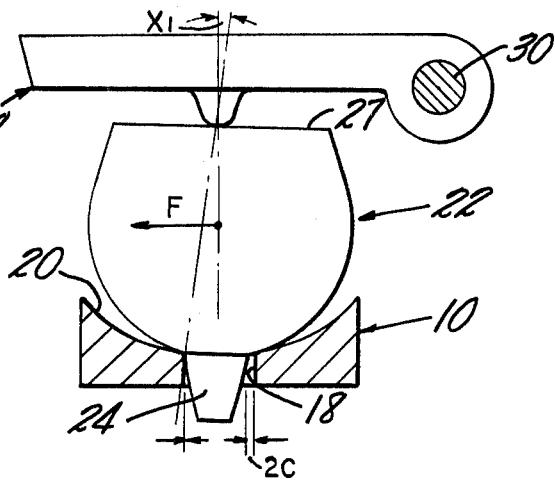

The inertial force F will initially slide the mass 22 slightly in the direction of the force and close the part of the gap on the side of the projection 24 away from the direction of force, as shown in FIG. 4B. The remaining gap leaves clearance to ensure that interference between the projection and the hole will not impede rolling motion of the mass from the position shown in FIG. 4B to the position shown in FIG. 4C, the latter being the full operating position.

In the position shown in FIG. 4B, the pressure angle $X_i$ [which, it will be recalled, is the angle between (a) a line connecting the contact points between (1) the mass and the support and (2) the mass and the pawl and (b) a line perpendicular to the surface of the mass at the contact point between the mass and the pawl] is comparatively small. Accordingly, the frictional force R1 at the position near the start of movement shown in FIG. 4B is relatively low. Moreover, inasmuch as the cam follower projection 28b contacts the then substantially horizontal, flat cam surface 27 on the mass, the initial acceleration of the pawl at the instant that the mass starts to roll to the left along the surface 20a of the support is also virtually zero. Accordingly, the force conditions (frictional and pawl acceleration) afforded by the invention are favorable for rapid, uniform and precise response to an inertial force produced by a given threshold level of acceleration.

From the position shown in FIG. 4B to that shown in 4C, the inertial force F produces rolling motion of the mass 22 along the conical surface 20a of the support, thereby tilting the cam surface 27 on the top of the mass such as to lift the pawl 28 upwardly for engagement with the ratchet, as mentioned above. As is quite apparent from FIG. 4D, for relatively small displacement d of the mass along the conical surface of the support and correspondingly small vertical displacement $dV_m$, the cam surface 27 of the mass imparts a substantial vertical displacement $dV_p$ of the cam follower on the pawl, which displacement is multiplied at the tip by lever action of the pawl.

The motion of the mass is stopped by engagement of the bottom projection 24 on the mass with the wall of the hole 18, assisted somewhat by engagement of the mass with the outer concave part 20b of the surface of the support base 12. In addition, the pawl 28 is fully seated in a tooth of the ratchet (not shown) so the pawl cannot lift up any higher when in the full operating position. The mass is also prevented from being dislodged from the support in all events by reason of entrapment between the pawl and the support, so it is unnecessary for the support to have perimeter walls to retain the mass.

Figure 4C:
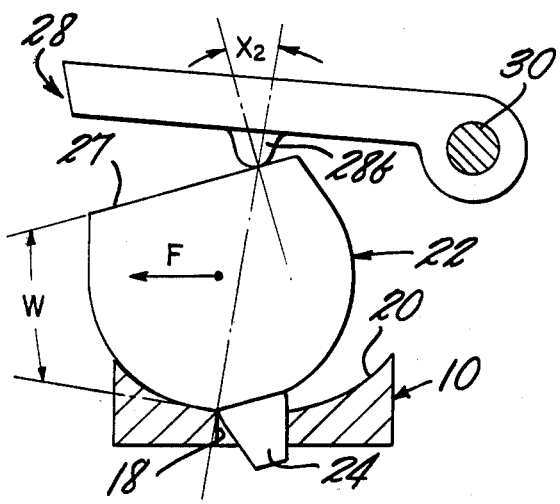
Figure 4D:
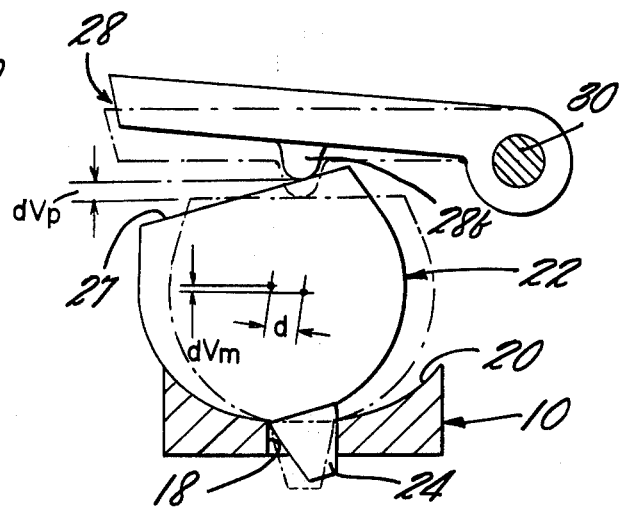

The mass readily rolls back from the full operating position shown in FIG. 4C to an upright position (FIG. 4A or 4B) by a wedging action between the pawl and the support acting through a wedge angle W defined by the slope of the conical portion of the support and the slope of the cam surface of the mass. It can be shown that restoration of the device embodying the invention is more efficient than with ball type devices because of the relatively large wedge angle W in the full operating position.

Figure 5:
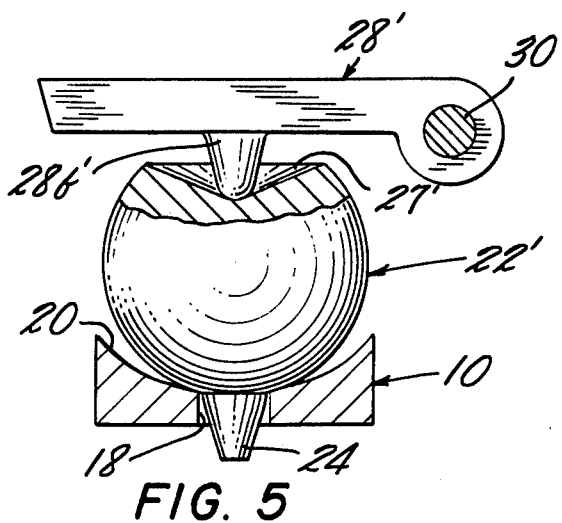
FIG. 5 is a side view, with portions broken into cross section, of a modified inertia mass and pawl.

Various cam and cam follower configurations can be substituted for those of the embodiment shown in FIGS. 1 through 4. For example, as shown in FIG. 5, a conical cam surface 27' can be used instead of the flat surface. The conical surface provides a greater vertical displacement of the pawl for a given vertical displacement of the mass than does a flat surface.

Figure 6:
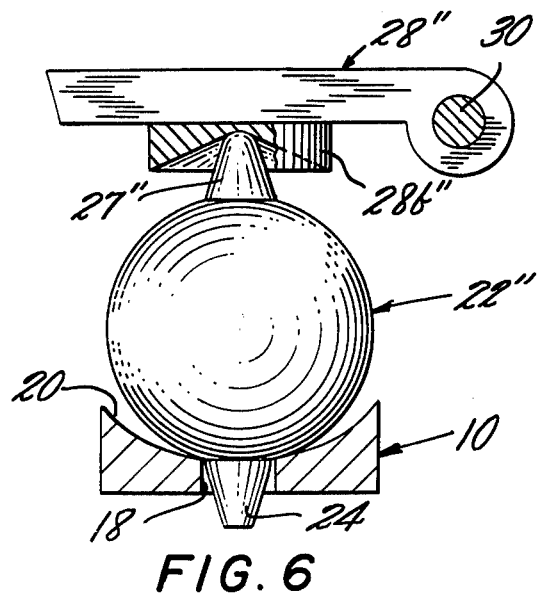
FIG. 6 is a side view, with portions broken away, of another modified inertia mass and pawl.

Another cam arrangement, as shown in FIG. 6, comprises an upwardly extending projection 27", the upper end of which constitutes a camming surface, and a follower 28b" on the pawl 28" in the form of a disc-like element having a downwardly facing conical follower surface.

Thus, there is provided, in accordance with the present invention, an inertia responsive actuating device of very simple construction that is easy and inexpensive to fabricate and assemble, is of small size, provides rapid, reliable, consistent operation, has a low hysteresis and, in general, embodies advantageous characteristics of both the ball type and standing weight type devices, but is essentially free of the disadvantages of those devices.

The above-described embodiments of the invention are intended to be merely exemplary and numerous variations and modifications may be made by those skilled in the art without departing from the spirit and scope of the invention. All such variations and modifications are intended to be included within the scope of the invention as defined in the appended claims.

I claim:

1. In inertia responsive actuating device for safety belt retractors comprising a support having a substantially circular hole and an upwardly facing surface of revolution about the axis of the hole surrounding the hole and sloping upwardly in all directions from the hole, an inertia mass supported on the support and having a locating projection received in the hole and a spherical surface surrounding the projection and adapted to roll up the upwardly facing surface of the support in any direction in response to an inertial force on the mass, an actuator having a portion that engages an upwardly facing surface on the mass and is displaceable generally upwardly in response to rolling motion of the mass, and coacting cam and cam follower means on the upper surface of the mass and said portion of the actuator for vertically displacing said portion of the actuator by an amount substantially greater than the vertical displacement of the mass itself when it rolls up the upwardly facing surface of the support.

2. An inertia responsive actuating device according to claim 1 wherein there is a clearance between the projection and the hole to reduce interference between the projection and the hole when the mass starts to roll up the upwardly facing surface.

3. An inertia responsive actuating device according to claim 1 wherein said upwardly facing surface of the support is a conical surface.

4. An inertia responsive actuating device according to claim 1 wherein the center of curvature of the spherical surface of the mass coincides substantially with the center of gravity of the mass.

5. An inertia responsive actuating device according to claim 1 wherein the actuator is a pawl that is mounted to pivot about an axis located generally above and laterally of the inertia mass.

6. An inertia responsive actuating device according to claim 5 wherein the cam follower means includes a dependent follower projection on the pawl located substantially vertically above the hole in the support and resting on the upwardly facing cam surface of the mass.

7. An inertia responsive actuating device according to claim 6 wherein the cam surface of the mass is substantially flat and lies perpendicular to an axis passing through the center of gravity of the mass and the center of the bottom projection.

8. An inertia responsive actuating device according to claim 6 wherein the cam surface of the mass is an upwardly and outwardly divergent conical surface having an axis that is coincident with an axis passing through the center of gravity of the mass and the center of the bottom projection.

9. An inertia responsive actuating device according to claim 5 wherein the cam and cam follower means include an upwardly extending projection at the top of the mass and a downwardly and outwardly divergent conical surface on the pawl that engages the upwardly extending projection.

* * * * *